United States Patent
Imamura et al.

(10) Patent No.: US 7,660,099 B2
(45) Date of Patent: Feb. 9, 2010

(54) CASE MOLDED CAPACITOR

(75) Inventors: Takeshi Imamura, Osaka (JP); Toshiharu Saito, Osaka (JP); Satoshi Hosokawa, Osaka (JP); Toshihisa Miura, Osaka (JP); Yoshinari Nagata, Toyama (JP)

(73) Assignee: Panasonic Corporation, Osaka (JP)

( * ) Notice: Subject to any disclaimer, the term of this patent is extended or adjusted under 35 U.S.C. 154(b) by 325 days.

(21) Appl. No.: 11/856,361

(22) Filed: Sep. 17, 2007

(65) Prior Publication Data

US 2008/0068775 A1 Mar. 20, 2008

(30) Foreign Application Priority Data

Sep. 19, 2006 (JP) ............... 2006-252073

(51) Int. Cl.
*H01G 4/32* (2006.01)
*H01G 4/015* (2006.01)

(52) U.S. Cl. .................. 361/301.5; 361/273

(58) Field of Classification Search .......... 361/273, 361/301.2, 301.3, 301.4, 301.5
See application file for complete search history.

(56) References Cited

U.S. PATENT DOCUMENTS

| 5,581,437 | A | * | 12/1996 | Sebillotte et al. | ............ 361/323 |
| 6,043,972 | A | * | 3/2000 | Westermann | ............ 361/301.3 |
| 2005/0263845 | A1 | * | 12/2005 | Saito et al. | .................. 257/516 |
| 2006/0104006 | A1 | * | 5/2006 | Saito et al. | ............... 361/301.3 |

FOREIGN PATENT DOCUMENTS

| JP | 01215008 A | * | 8/1989 |
| JP | 01257317 A | * | 10/1989 |
| JP | 2004-303934 | | 10/2004 |
| JP | 2005-093515 | | 4/2005 |

* cited by examiner

*Primary Examiner*—Eric Thomas
(74) *Attorney, Agent, or Firm*—Pearne & Gordon LLP

(57) ABSTRACT

A case molded capacitor has a metallized film capacitor, a pair of bus bars, a resin-made internal case, molding resin, a metal external case, and a buffer material layer. The bus bars are each connected to respective one of electrodes of the metallized film capacitor. The internal case contains the metallized film capacitor. The metallized film capacitor is submerged with molding resin in the internal case so as to expose parts of the bus bars. The external case contains the internal case and both cases are connected at a connecting part. A buffer material layer is put in a gap made at least at a part between the internal case and the external case.

4 Claims, 4 Drawing Sheets

CASE MOLDED CAPACITOR

BACKGROUND OF THE INVENTION

1. Field of the Invention

The invention relates to a case molded capacitor, which is a metallized film capacitor resin molded in a case, and suitably used for a variety of electronic devices, electrical equipment, industrial equipment, automotive vehicles and the like. The capacitor is especially useful for the purpose of smoothing, filter or snubber in a motor driving inverter circuit of a hybrid vehicle.

2. Background Art

In recent years, many kinds of electronic devices are controlled by an inverter circuit in view of the environment protection, especially to save energy and achieve high efficiency. In this circumstance, an automotive industry is particularly introducing to market a hybrid electric vehicle (hereinafter, HEV) which runs with an electric motor with a gasoline engine. As it is typically represented by the HEV case, technique which is benign to earth environment and realizing energy saving and high efficiency is actively pursued.

Working voltage of a HEV motor is several hundreds volts. Because of the high voltage, a metallized film capacitor having a high withstanding voltage and a low loss is getting an attention as a capacitor suitable for the HEV motor. A maintenance-free product is a recent demand, so the metallized film capacitor having an exceedingly long life is remarkably used.

However, when alternating voltage is applied to the metallized film capacitor, a ripple current may be generated and vibrate the capacitor and causing an audible noise. When the metallized film capacitor is used for smoothing in an inverter circuit of HEV, an audible frequency in several to 15 kHz is applied as a switching frequency. So, the noise that the capacitor generates needs to be reduced as much when it is used for a vehicle which requires a high level of quietness.

The noise is entirely different from a beat sound generated by a consumer type metallized film capacitor that is used for a commercial frequency of 50 to 60 Hz. Countermeasure to such commercial type capacitor is thus not effective to the automotive type capacitor, and various proposals are made for reducing the noise generated at high frequency zone.

One way of reducing noise caused by vibration of capacitor is publicly disclosed by Unexamined Japanese Patent Publication No. 2004-303934, in which a production method of a capacitor capable of suppressing a vibration which alternating voltage causes is described. In this method, a capacitor element is manufactured by stacking and winding metallized plastic films, each in which an electrode film is deposited on a dielectric film. The wound capacitor element is then impregnated with liquid insulating material, such as methyl hydrogen silicone oil, a crosslinking reactive monomer of low viscosity of 25 mm$^2$/s at 25° C. The element is then heated for 15 minutes at 130° C. or 60 minutes at 100° C. so that the methyl hydrogen silicone oil is polymerized to have a high viscosity.

The applicant of this invention disclosed another method of reducing noise of metallized film capacitor in Unexamined Japanese Patent Publication No. 2005-93515. This method reduces noise by putting a metallized film capacitor in a resin case and then resin-molding the capacitor. The method is further explained below.

FIGS. 4A and 4B are a cross-sectional front view and a cross-sectional side view of the metallized film capacitor, showing structure of the capacitor. Sound proofing and sound absorbing material 15 made of foamed urethane is disposed between outside of wound metallized film capacitor element 11 and inside of resin case 12. This structure prevents noise of capacitor element 11 to be propagated outside, enhancing sound insulation capability and reducing noise emission.

According to the conventional metallized film capacitors, the former capacitor controls vibration by itself and reduces noise, and the later capacitor is resin molded in the resin case to reduce vibration and noise. However, the noise is not completely eliminated with either of the method, and further quietness is needed for an HEV application. The metallized film capacitor molded in case 12 in FIG. 4A may be further put in a metal case before it is assembled into a metal inverter box to be installed in a vehicle. In this case, however, the vibration and noise still propagates through a joining part between the metal case and resin case 12 into a vehicle cabin. For reducing the unwanted noise, the vibration needs to be suppressed at much higher level.

SUMMARY OF THE INVENTION

The invention is to solve above mentioned problems and provide a case molded capacitor capable of reducing noise generation by controlling propagation of vibration of a metallized film capacitor.

The case molded capacitor of the present invention has a metallized film capacitor, a pair of bus bars, a resin-made internal case, molding resin, a metal external case, and a buffer material layer. Each of the bus bars is connected to respective one of electrodes of the metallized film capacitor. The internal case contains the metallized film capacitor. The metallized film capacitor is submerged in the molding resin within the internal case so as to expose parts of bus bars. The external case contains the internal case and is fixed with the internal case at a connecting part. The buffer material layer is put in a gap made at least at a part between the internal case and the external case except for the connecting part joining both cases.

With this constitution, even when alternating voltage is applied to the metallized film capacitor causing ripple current thereby vibrating the capacitor, the buffer material layer works for moderating the vibration of the capacitor.

Vibration to be propagated through the connecting part of the cases toward outside is thus greatly reduced, resulting in reduction of noise generation.

DETAILED DESCRIPTION OF THE INVENTION

Figure 1A:
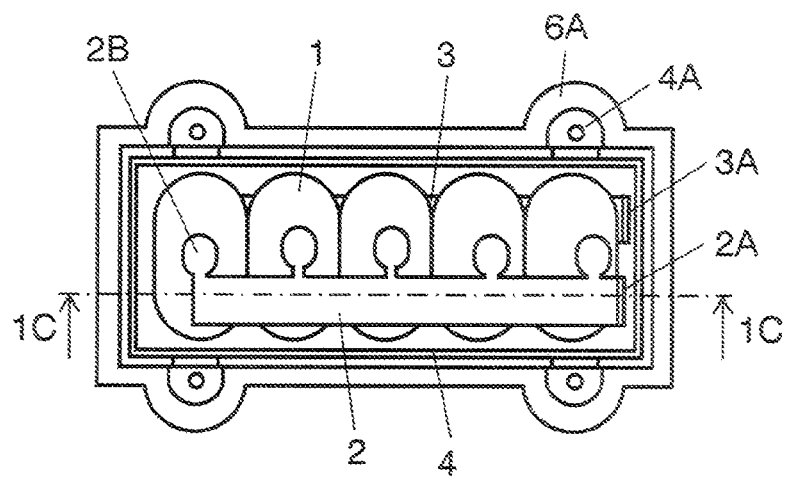
FIG. 1A is a plain view of a case molded capacitor according to an exemplary embodiment of the present invention.
Figure 1B:
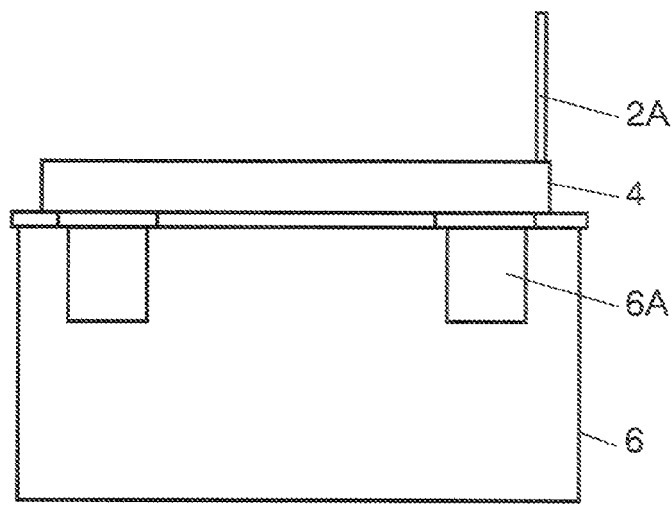
FIG. 1B is a front view of the case molded capacitor shown in FIG. 1A.
Figure 1C:
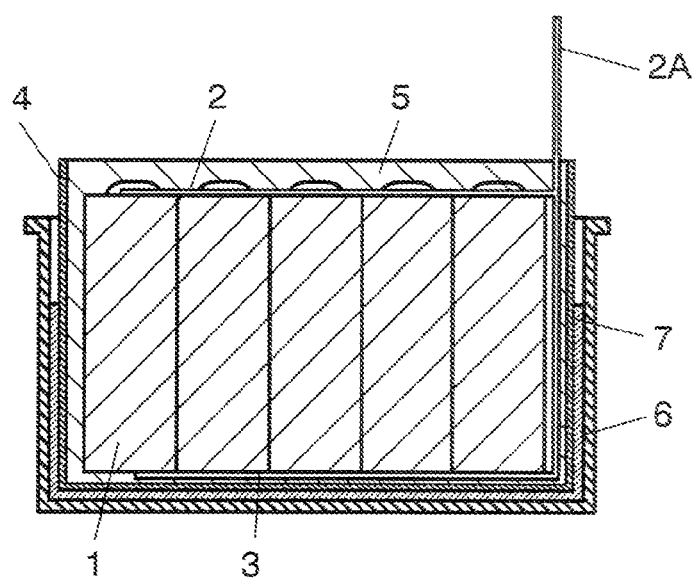
FIG. 1C is a cross sectional front view of the case molded capacitor shown in FIG. 1A.
Figure 2:
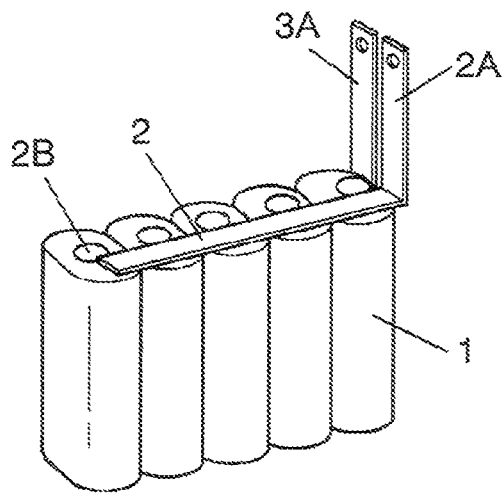
FIG. 2 is an exploded perspective view of the case molded capacitor shown 15 in FIG. 1A.
Figure 2:
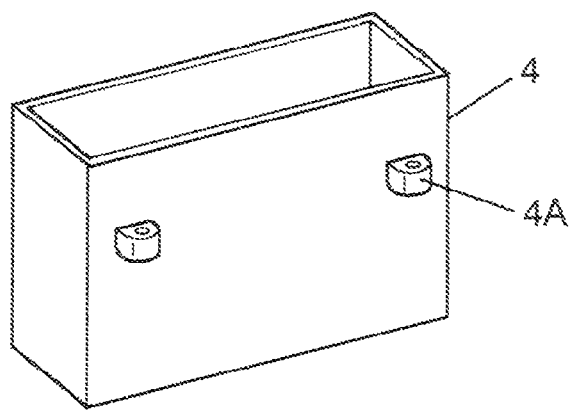
Figure 2:
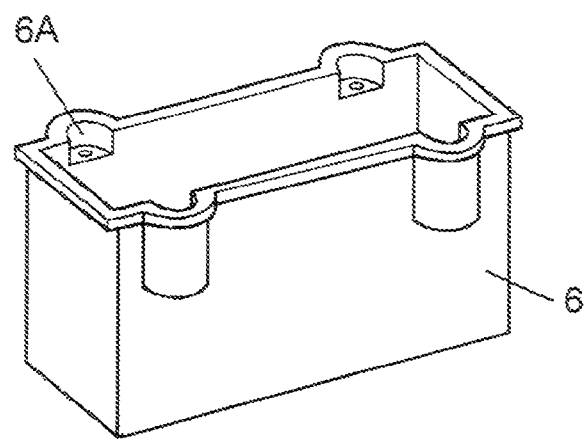

FIG. 1A is a plain view of a case molded capacitor according to an exemplary embodiment of the present invention. To simply illustrate a structure, molding resin 5 is excluded in the drawing, but which is described later. FIG. 1B is a front view of the same, and FIG. 1C is a cross sectional front view the same taken along line 1C-1C in FIG. 1A.

The case molded capacitor has metallized film capacitor 1, a pair of bus bars 2 and 3, resin-made internal case 4, molding resin 5, metal external case 6, and buffer material layer 7.

Metallized film capacitor 1 is composed of a pair of metallized films (not shown). Each of the metallized film is a dielectric film on which a metal electrode is vacuum evaporated. More specifically, the metallized films are wound to make up a capacitor element, in which the vacuum evaporated metal electrodes are faced through the dielectric film. Metal sprayed electrodes are then formed on each side of the element by a melted metal spraying method.

Bus bars 2 and 3 are each connected to respective electrode of metallized film capacitor 1. At an end portion of bus bars 2 and 3, terminals 2A and 3A are formed for external connection. As mentioned, the pair of metal sprayed electrodes is formed at each end face of metallized film capacitor 1. Bus bar 2 is connected to a plurality of lined up metallized film capacitors 1 and by solder-fixing to one set of the metal sprayed electrodes through soldering terminal 2B. Similarly, bus bar 3 is solder-fixed to the other set of metal sprayed electrodes through a non-illustrated soldering terminal in the rear side. In this way, metallized film capacitors 1 are connected in parallel. In FIG. 1A, five metallized film capacitors 1 are connected in parallel, for example.

Internal case 4 contains metallized film capacitors 1 connected in parallel with each other via bus bars 2 and 3. Internal case 4 is provided with connecting parts 4A. Internal case 4 is typically made of polyphenylene sulfide (PPS).

Molding resin 5 is poured into internal case 4 and is hardened. Molding resin 5 therefore covers metallized film capacitors 1, bus bars 2 and 3 so as to expose terminals 2A and 3A of bus bars 2 and 3 out of internal case 4. Namely, metallized film capacitors 1 is submerged in molding resin 5 within internal case 4 in a manner that portions of bus bars 2 and 3 are exposed. Molding resin 5 is typically made of epoxy resin.

External case 6 contains internal case 4 which contains resin molded metallized film capacitors 1 connected in parallel with each other via bus bars 2 and 3. External case 6 is provided with connecting parts 6A. External case 6 and internal case 4 are fixed with each other at respective connecting parts 6A and 4A via non-illustrated bolts or the like. Namely, external case 6 contains internal case 4, and the external case is connected with internal case 4 at connecting parts 4A and 6A. External case 6 is typically made of aluminum.

Buffer material layer 7 is put in a gap made between internal case 4 and external case 6 but avoiding connecting parts 4A and 6A. Namely, buffer material layer 7 is disposed between internal case 4 and external case 6 excluding connecting parts 4A and 6A. Buffer material layer 7 is typically made of urethane resin.

Figure 3:
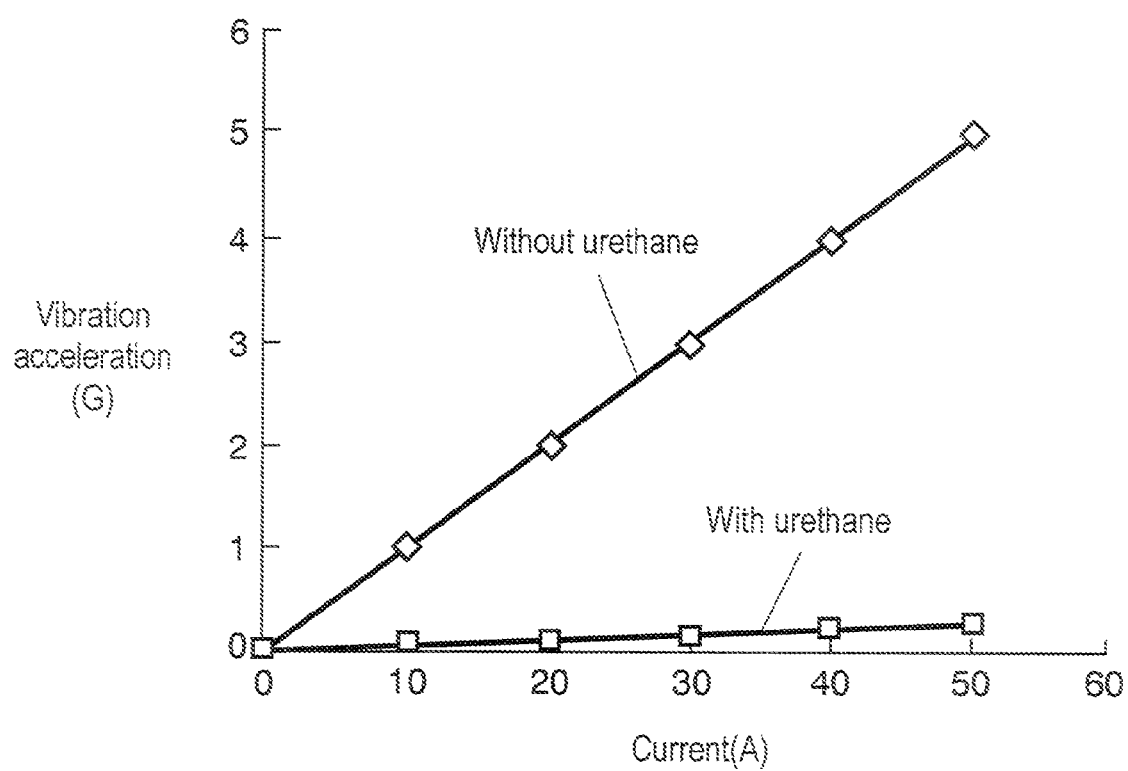
FIG. 3 is a vibration characteristic chart of the case molded capacitor according to the exemplary embodiment of the present invention.
Figure 4A:
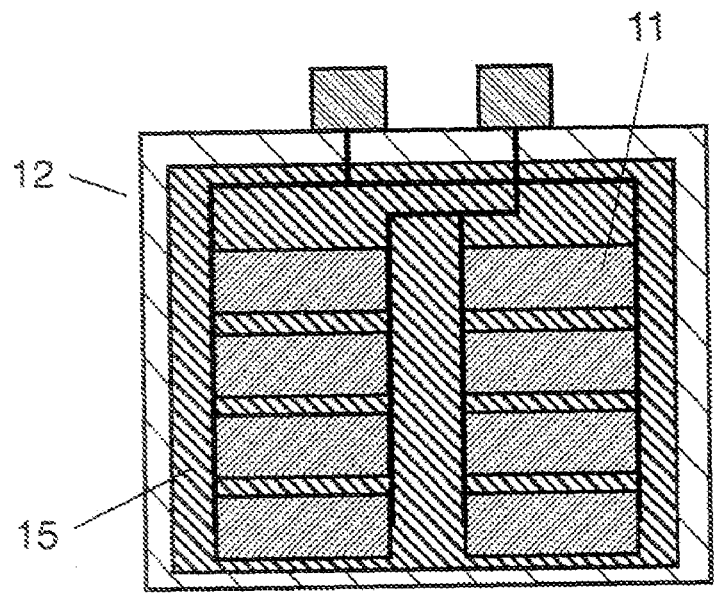
FIG. 4A is a cross sectional front view of a conventional case molded capacitor.
Figure 4B:
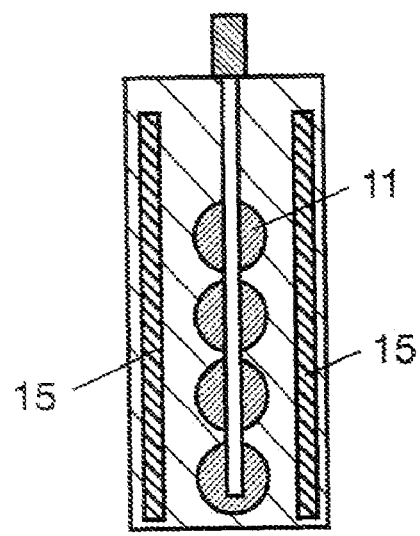
FIG. 4B is a cross sectional side view of the case molded capacitor shown in FIG. 4A.

FIG. 3 shows a vibration characteristic of the case molded capacitor thus constituted with a characteristic of a comparison sample not having buffer material layer 7.

Metallized film capacitor 1 in the case molded capacitor has a rated voltage of 500 V and a rated capacity of 1500 μF. The vibration characteristic is obtained by first applying direct current voltage of 500 V to the case molded capacitor at an ambient temperature of 25° C., and then varying current from 10 A to 50 A at a frequency of 5 kHz. Resulting vibration acceleration (G) is then measured by a vibration acceleration pickup applied to a predetermined position of external case 6.

The case molded capacitor according to the exemplary embodiment includes buffer material layer 7 of urethane resin put in the gap between internal case 4 and external case 6. In this structure, even when alternating voltage is applied to metallized film capacitor 1 causing a ripple current thereby vibrating the capacitor, buffer material layer 7 moderates the vibration. As is evidently shown in FIG. 3, vibration acceleration propagating toward external case 6 is reduced by $\frac{1}{20}$ of the comparison sample, which indicates a significant reduction of noise emission.

Material of buffer material layer 7 is not restricted to urethane resin. Any material may be utilized as long as it can be put in the gap between internal case 4 and external case 6, has an elastic modulus lower than internal case 4, and functions as a buffer material. Material having an equal or lower elastic modulus than urethane resin is preferably used for the layer.

Depending on frequency of undesired noise or on ambient temperature, material having a large loss factor may be conveniently used. For examples, epoxy resin or silicone resin commonly used as potting resin can be used for buffer material layer 7. Among those resin materials, urethane resin has a lower elastic modulus and a lower hardness than epoxy resin, and more effectively works as buffer material layer 7. Namely, urethane resin has a higher loss factor and a higher mechanical tan δ which are vibration attenuation indexes than epoxy resin. Besides, urethane resin is lower in cost than silicone resin, which is suitable for mass production. Because of such reasons, urethane resin is preferably used for buffer material layer 7.

Material of internal case 4 is not restricted to PPS. Polybuthyrene terefthalate (PBT) or polycarbonate can be used to constitute internal case 4. However, PPS has a higher heat resistance and a higher moisture resistance, and it is stronger than PBT, so that PPS is preferably used for its excellent durability.

Material of external case 6 is not restricted to aluminum. The case may be made of other metal such as stainless steel, or even resin similar to that of internal case 4. However, when considering an automotive requirement for a good heat dissipation, a strength, a light weight and that the case is assembled into the metal inverter box installed in a vehicle, aluminum die cast external case 6 is preferable.

In the present embodiment, five metallized film capacitors 1 are connected in parallel, but the number of the capacitors is not restricted to five. The capacitors may be connected in series instead of parallel, or they may be connected in parallel and in series. A single metallized film capacitor 1 may still constitute the case molded capacitor.

With the case molded capacitor of the present invention, vibration of the metallized film capacitor is controlled so that noise generation is greatly reduced. The capacitor is therefore useful for automotive application especially for an HEV which requires a higher level of quietness.

What is claimed is:

1. A case molded capacitor comprising:
a metallized film capacitor;
a pair of bus bars each connected to respective one of electrodes of the metallized film capacitor;
a resin-made internal case containing the metallized film capacitor;
molding resin in which the metallized film capacitor is submerged within the internal case so as to expose parts of the bus bars;
a metal external case containing the internal case and being fixed with the internal case at a connecting part; and
a buffer material layer being put in a gap made at least at a part between the internal case and the external case except for the connecting part joining the cases.

2. The case molded capacitor according to claim 1, wherein the buffer material layer is made of urethane.

3. The case molded capacitor according to claim 1, wherein the internal case is made of polyphenylene sulfide.

4. The case molded capacitor according to claim 1, wherein the external case is made of aluminum.

* * * * *